May 22, 1945.   H. D. WIMER, JR., ET AL   2,376,745
HINGE BRACKET AND ATTACHMENT
Filed March 15, 1943   2 Sheets-Sheet 2
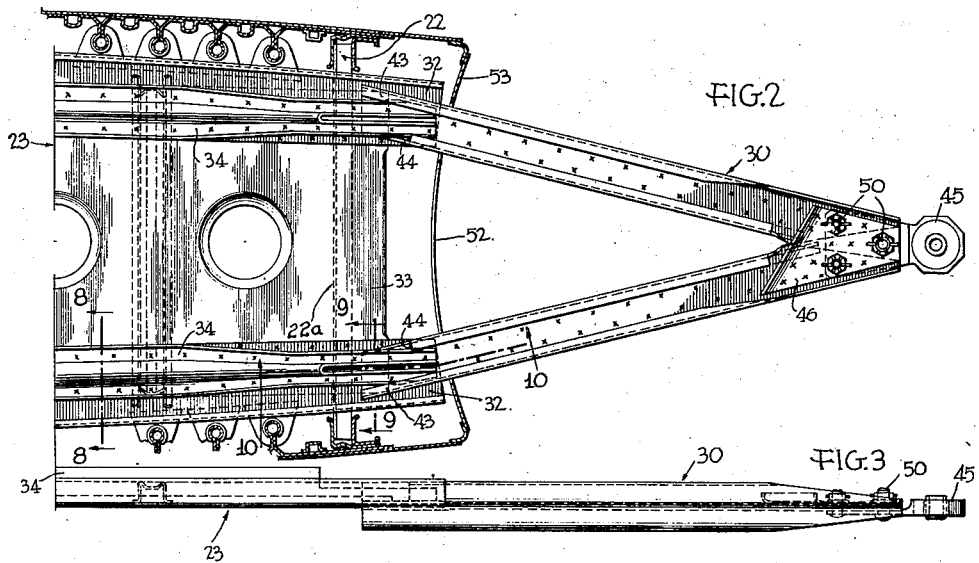
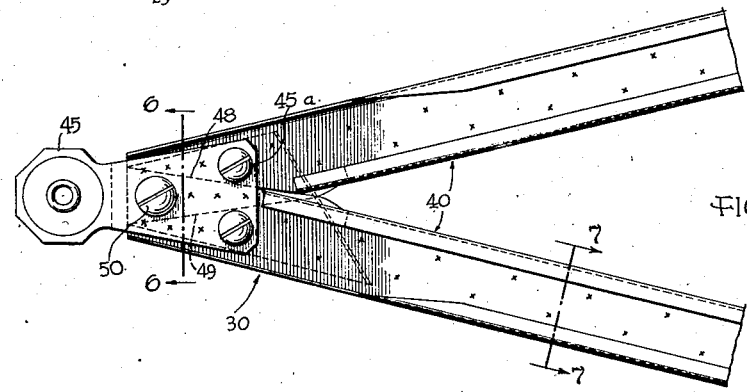
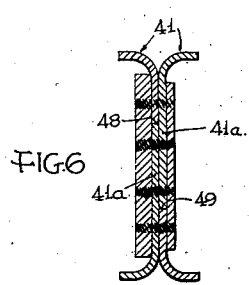
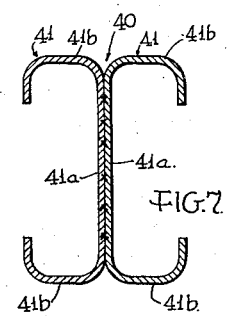
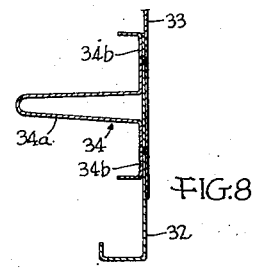
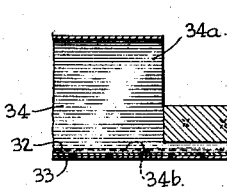
INVENTORS.
Howard Dudley Wimer, Jr.
Frank P. Bender.
BY
John P. Tatry
ATTORNEY Patented May 22, 1945

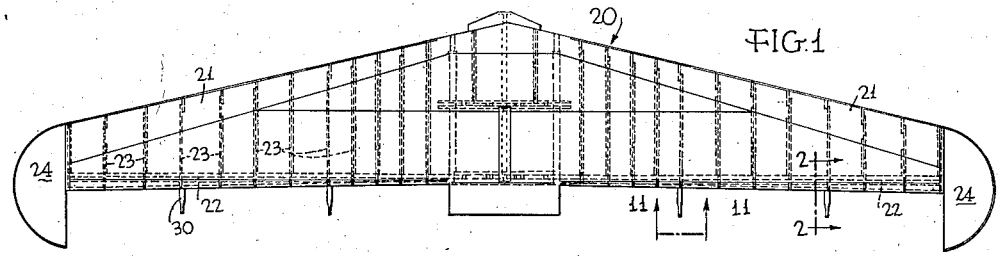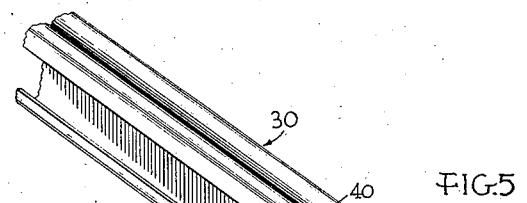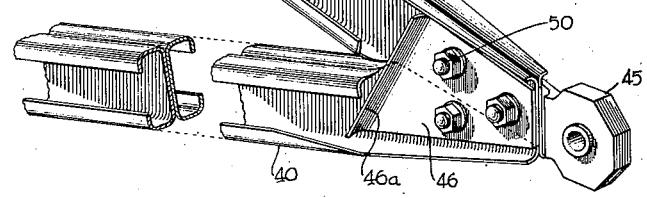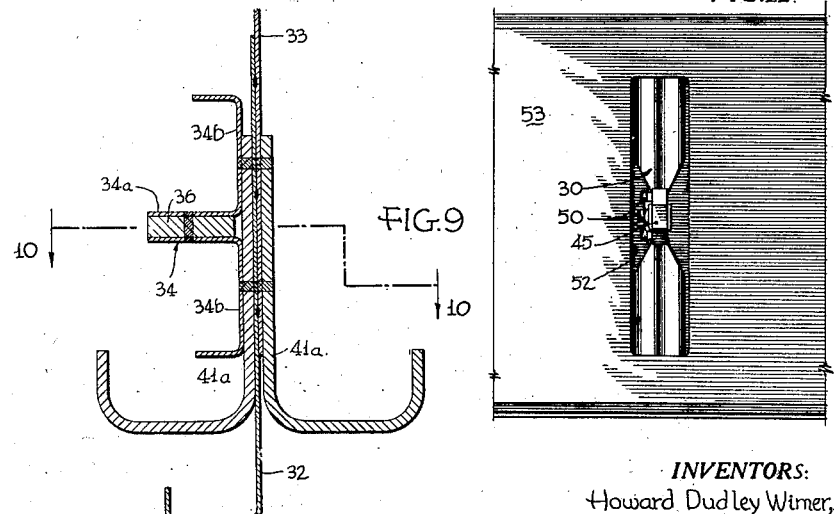

2,376,745

UNITED STATES PATENT OFFICE 2,376,745

HINGE BRACKET AND ATTACHMENT

Howard Dudley Wimer, Jr., and Frank P. Bender, Philadelphia, Pa., assignors to Edward G. Budd Manufacturing Company, Philadelphia, Pa., a corporation of Pennsylvania Application March 15, 1943, Serial No. 479,722

6 Claims. (Cl. 244—117)

This invention relates to airfoils and particularly to a hinge mounting thereon for a dirigible member, such as an aileron, rudder, elevator, or flap, and has for an object the provision of improvements in this art.

One of the particular objects of the invention is to provide a hinge bracket which is very sturdy and also very light. Another object is to provide an improved connection between the bracket and the rear end of an airfoil rib in the region of a rear spar. Another object is to provide an improved connection for the rear ends of the bracket members and for a hinge socket member.

These and other objects and advantages of the invention will be revealed by the following description of a specific embodiment thereof, reference being made in the description to the accompanying drawings, wherein:

Fig. 1 is an elevation of an airfoil, as for example a horizontal stabilizer fin, which carries hinge brackets formed and mounted in accordance with the present invention;

Fig. 2 is an enlarged vertical side elevation of a rib carrying a hinge bracket, the view being taken about on the line 2—2 of Fig. 1;

Fig. 3 is a plan view looking up at Fig. 2;

Fig. 4 is a further enlarged side elevation of the outer end of a bracket, the view being opposite to that of Fig. 2;

Fig. 5 is an enlarged perspective view of the outer end of the bracket as shown in Fig. 2;

Fig. 6 is an enlarged vertical section of the joint at the outer end of the bracket, the section being taken on the line 6—6 of Fig. 4;

Fig. 7 is an enlarged vertical section of a bracket arm along the main or body portion thereof, the section being taken on the line 7—7 of Fig. 4;

Fig. 8 is an enlarged vertical section of the lower chordal portion of a rib, the section being taken on the line 8—8 of Fig. 2;

Fig. 9 is an enlarged vertical section of the lower chordal portion of a rib at the outer end where a hinge bracket arm is connected, the view being taken on the line 9—9 of Fig. 2;

Fig. 10 is a horizontal section taken on the line 10—10 of Fig. 2 on an enlarged scale and on the corresponding line of Fig. 9 on a reduced scale; and Fig. 11 is an enlarged rear view taken from about the line 11—11 of Fig. 1 and showing how the rib chords extend through the web of the rear airfoil spar and the arch sheet.

Referring to Fig. 1, the illustrated airfoil 20, here exemplified as a horizontal stabilizer fin, is provided with spanwise spars 21 and 22, ribs 23, and tips 24. The forward spar 21 is formed by a special construction of the leading edge of the airfoil, not necessary to detail here; and the rearward or main spar 22 is formed by a chord and web construction which is detailed insofar as necessary in Fig. 2. The ribs 23 are of varied character but that is irrelevant here, it being sufficient to observe that some of the ribs at their rear ends behind the main spar 22 carry the hinge brackets 30 with which the present invention is concerned.

Referring to Fig. 2, the rib 23 comprises chordal cap strips 32 and a connecting web 33. The cap strips 32 are strengthened by "sombrero" hat-sectioned or flanged channel-sectioned reinforcing members 34 which extend approximately to the rear ends of the cap strips. All rib elements are secured together by welding. Fig. 8 is a typical partial vertical transverse section through these rib elements.

As shown in Figs. 2, 9 and 10, the channel portion 34a of the rib reinforcing members 34 is squeezed together at the end and a strengthening filler bar 36 is secured therein. As shown in these figures, the outer part of the channel portion 34a is cut away for a distance back from the end to permit the rib elements to be inserted through appropriate openings in the web 22a of the rear spar 22. The elements of the ribs 23 to which the hinge brackets 30 are to be secured are left unwelded at the rear ends at the time of assembly to permit the front ends of the hinge bracket arms 40 to be welded thereto behind the spar 22 after assembly.

As shown, particularly in Figs. 4, 5 and 7, the arms 40 of the hinge brackets 30 are each formed of inturned-flange channel-shaped arm elements 41 which in the main or body portion of their length are welded together back-to-back through their webs 41a. The arm elements 41 are cut at certain places, as hereinafter described, before they are welded together. The ends are left unwelded for a time.

As shown in Figs. 2, 9 and 10, the arm elements 41 are bent apart at their inner ends to embrace the ends of the rib web 33 and the parallel inner flange of the cap strip 32. The flanges 34b of the rib reinforcing member 34 are welded to the web 41a of one of the arm elements 41 on the side opposite that on which the flange of cap strip 32 and the rib web 33 are welded. Here, both flanges 41b of the arm element 41 are cut away for a distance back from the end, as best shown in Fig. 10, to the line 43 to receive the end of the reinforcing strip 34 and to permit welding of the parts. The opposite arm element 41, the one whose web 41a lies against the rib web 33, has only its inner flange 41a cut away as shown at 44 in Fig. 2, to clear the edge of the rib member 34.

As shown in Figs. 2, 4 and 5, the hinge brackets 30 formed by the arms 40 are V-shaped in vertical elevation, the arms being connected at their inner ends to the upper and lower chordal members of the rib, as just explained, and being connected together in a spliced joint at their outer ends, as shown in Figs. 2, 3, 4, 5 and 6. A hinge socket member 45 is welded through its plate 45a to one side of the joint and a backing plate 46 is welded to the other side of the joint. The plate 46 carries a rigidifying flange 46a.

The arm elements at the joint are spliced together in such a way as to assume a coplanar relationship, or more specifically to place the webs 41a of the paired elements of the merging arms 40 in common vertical planes. The webs of opposed elements meet in spaced transplanar surfaces 48 and 49, as best shown in Figs. 4 and 6, which are approximately aligned respectively with the inner or adjacent edges of the arms. Specifically, the flanges 41b are all cut back from the outer end at an angle along vertical planes, as shown in Fig. 3; then the inner flanges are flattened out into the planes of the webs 41a and alternate flanges and part of the webs 41a are cut away at an angle to meet the edges of the adjacent coplanar flattened flanges. The resulting staggered transverse planes of juncture 48, 49 have already been described.

The joint may be strengthened by clamping bolts 50.

It is thus seen that the invention provides a very light sturdy hinge bracket with an improved connection with a rib and having an improved joint at the outer end which mounts the hinge socket member.

While one embodiment of the invention has been described to illustrate the principles of the invention it is to be understood that the invention may have various embodiments within the limits of the prior art and the scope of the subjoined claims.

What is claimed is:

1. In combination, an airfoil having a framework embodying ribs provided with rib-aligned webs having in their rearward extremities longitudinally extending reinforcements therefor at vertically spaced points, which reinforcements are of flange-channel cross section, a rear spar through which said channel cross section passes by an opening less in width than the depth of said channel, the bottom of the rear end portion of the side walls of said channel being cut away to permit passage through the spar opening, and a hinge bracket for a control surface connected with said rib and its reinforcements to the rear of the spar.

2. An airfoil and hinge bracket according to claim 1, in which the channel cross section in the cut away portion is reinforced by securing between its side walls a reinforcing member connecting said side walls.

3. In combination, an airfoil surface having a frame, and a hinge bracket comprised of a V-shaped structure formed of channel-section members secured at their inner ends to said airfoil surface frame and at their outer ends having their channel bottoms cut on a bias to bring them into a common plane, together with a hinge socket member provided with plates flanking said mated outer portions and securing them together and also securing the socket member to the channel-section members, the members forming said V-shaped bracket being composed each of two channel-shaped elements connected back-to-back and said elements having their channel bottoms on each side of a central vertical plane connected in common transverse planes, with the transverse edge-abutting joint lines disposed out of registry with each other to form a web splice between them.

4. In combination, a main airfoil including a frame comprising ribs and a rear spar, the ribs having chordal members projecting rearwardly of the rear spar, lengthwise extending reinforcements for said chordal members, and a hinge bracket for a control surface anchored to a rib, said hinge bracket including arms each having an element secured between a rib chord member and its reinforcement.

5. In combination a main airfoil including a frame comprising ribs and a rear spar, the ribs having chordal members projecting rearwardly of the rear spar, and a hinge bracket for a control surface anchored to a rib, said hinge bracket including arms each comprising two elements connected together in their main bodies but spread apart at the end to embrace a rearwardly projecting chordal member between them and being secured thereto.

6. In combination, an airfoil control surface having a framework comprising ribs having plane-form intersurface portions extending to the rear portion of the surface, and a hinge bracket for a control surface comprising a V-shaped structure composed of web-section members connected back-to-back in their webs, at their inner ends embodying an anchorage to the plane-form portion of the ribs, and at their outer ends having their webs cut on a bias on each side of a central vertical plane to meet in different common transverse planes with portions of the webs on opposite sides of the central plane overlapping, said web-section members also being provided at their joined ends with a flanking hinge socket member anchored thereto by a hinge plate and uniting the outer ends of the web-section members together.

HOWARD DUDLEY WIMER, JR.
FRANK P. BENDER.